United States Patent [19]

Sasaki

[11] Patent Number: 4,502,958

[45] Date of Patent: Mar. 5, 1985

[54] METHOD AND DEVICE FOR THE SEPARATION OF SUSPENDED SOLIDS IN WASTE WATER

[76] Inventor: Takahisa Sasaki, 821-114 Furukawa-cho, Matsuyama-shi, Ehime, Japan

[21] Appl. No.: 445,693

[22] Filed: Dec. 1, 1982

[30] Foreign Application Priority Data

Dec. 1, 1981 [JP] Japan ............................ 56/194110

[51] Int. Cl.³ .......................... B01D 35/06; B03C 1/10
[52] U.S. Cl. .................................... 210/695; 209/214; 209/223 R; 210/223
[58] Field of Search .................. 210/695, 222, 223; 209/214, 223 R

[56] References Cited

U.S. PATENT DOCUMENTS 3,697,420 10/1972 Blaisdell et al. .................... 210/695

Primary Examiner—Frank Sever
Attorney, Agent, or Firm—Koda and Androlia

[57] ABSTRACT

A method for the separation of suspended solids in waste water is disclosed. In order to clean waste water, suspended solids contained in the waste water are separated by adding a magnet-sensitive powder to the waste water, forming agglomerates by adhesion of the suspended solids with the magnet-sensitive powder, whereby the suspended solids are increased in weight to promote gravity settling, and attracting the agglomerates to one or more magnets attached to the bottom of the separation tank to precipitate the agglomerates rapidly. A device for the separation of suspended solids in waste water is also disclosed.

23 Claims, 10 Drawing Figures

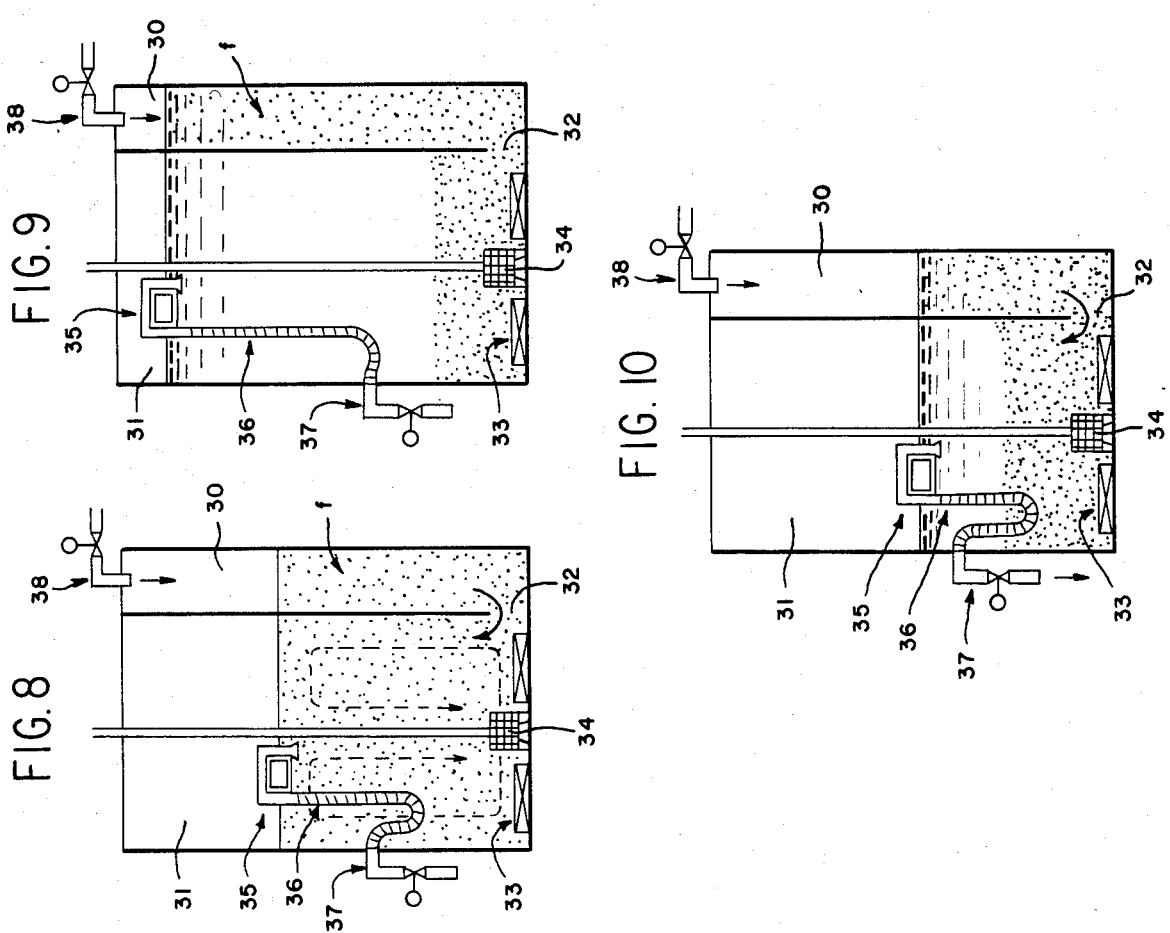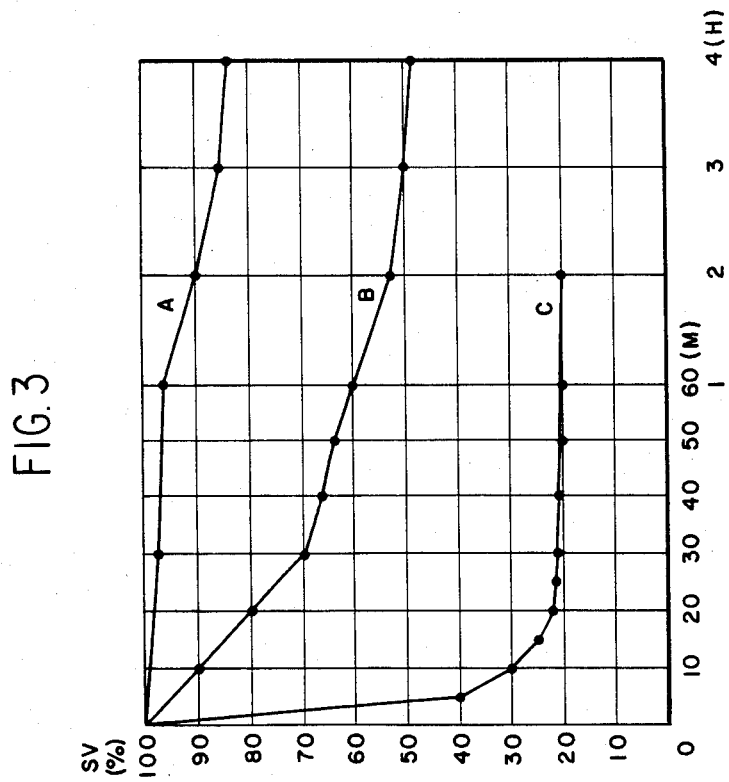

METHOD AND DEVICE FOR THE SEPARATION OF SUSPENDED SOLIDS IN WASTE WATER

BACKGROUND OF THE INVENTION

1. Field of the Invention

The present invention relates to a method and device for rapid separation of organic or inorganic suspended solids contained in industrial and home waste water from the water.

2. Prior Art

In order to clean industrial and home waste water containing organic or inorganic suspended solids, there is generally adopted either an activated sludge method in which the organic suspended solids are self-digested by microorganisms in the sludge or a coagulative precipitation method in which the suspended solids are precipitated by adding a coagulant.

Furthermore, there has already been known a method for the separation of suspended solids, in which the suspended solids are adhered to a magnet-sensitive powder and the resulting agglomerates are attracted to one or more magnets and recovered. This method is conventionally carried out by submerging a part of a disc or belt or the like having a permanent magnet attached thereto into a tank in which the waste water containing the agglomerates is charged, rotating or running the disc or belt and then scraping away the agglomerates attracted to the disc or belt outside the tank to recover the sludge. By this method, only the agglomerates attracted to the magnets running along a predetermined place in the tank are recovered, while the agglomerates far from the magnet are not attracted to the magnets and remain always in the tank. Even if the liquid in the tank is stirred, all agglomerates can not be recovered and some agglomerates are contained in the treated water. Therefore, this method does not have sufficient cleaning effects.

SUMMARY OF THE INVENTION

Accordingly, an object of the present invention is to provide a method for the separation of suspended solids in waste water, in which the suspended solids are rapidly precipitated by using a magnet-sensitive powder and one or more magnets and in which high separation efficiency of the suspended solids and high output capacity for waste water can be attained.

Another object of the present invention is to provide a device for the separation of suspended solids in waste water, which can be applied to both continuous activated sludge method and coagulative precipitation method and can attain high separation efficiency of the suspended solids and high output capacity for waste water.

A further object of the present invention is to provide a method for the separation of suspended solids in waste water, which can be applied to the activated sludge methods of both batch-type and continuous-charging batch-type and which can attain high separation efficiency of the suspended solids and high output capacity for waste water.

The other object of the present invention is to provide a method for the separation of suspended solids in waste water, which can be economically carried out, and uses a compact device therefor.

According to the present invention, there is provided a method for the separation of suspended solids in waste water, which comprises adding a magnet-sensitive powder to the waste water, adhering the suspended solids to the magnet-sensitive powder to produce agglomerates, whereby the suspended solids are increased in weight and rapidly precipitated, and passing the waste water containing the agglomerates through a relatively narrow passage formed in the face of a magnet attached to the bottom of the separation tank so as to attract the agglomerates to the magnets and separate the agglomerates efficiently from the water.

The present invention also provides a method for the separation of suspended solids in waste water, which comprises scraping away agglomerates attracted to the one or more magnets attached to the bottom of the separation tank by a scraper rotating in contact with the surface of the magnets, so that the magnets can always be freshly operated and attain high attraction efficiency.

Furthermore, the present invention provides a device for the separation of suspended solids in waste water, which comprises a separation tank consisting of an inner tank and an outer tank, one or more magnets attached to the surface of the reverse conical bottom of the outer tank, the bottom of the inner tank being arranged relatively near to the magnets, a passage through which the waste water flows from the central opening of the inner tank to the outer tank or from the outer tank to the inner tank, and a scraper rotating in contact with the surface of the magnet to scrape away agglomerates attracted to the magnets. The device of the present invention can be applied to the activated sludge method and the coagulative precipitation method for the continuous treatment of waste water.

According to the present invention, there is provided a method for the separation of suspended solids in waste water, which comprises using one or more magnets and a magnet-sensitive powder in a batch-type activated sludge method consisting of a step of charging waste water, an aeration step, a precipitation step and a step of discharging the supernatant, and operating the magnets during the precipitation step and, if desired, the discharging step to attain rapid precipitation.

According to the present invention, there is also provided a method for the separation of suspended solids in waste water, which includes connecting a lower part of a receiving chamber for the waste water continuously charged with a treatment chamber in which the aeration, precipitation and discharging steps are successively carried out to treat the waste water by an activated sludge method of a continuous-charging batch-type, using one or more magnets and a magnet-sensitive powder and operating the magnets during the precipitation step and, if desired, the discharging step to attain rapid precipitation.

BRIEF DESCRIPTION OF THE DRAWINGS

in FIG. 1, waste water is charged from the top of the inner tank and the supernatant is discharged from the top of the outer tank. Contrary to this, in FIG. 2 the waste water is charged from the top of the outer tank and the supernant is discharged from the top of the inner tank;

FIG. 3 shows a graphical illustration of rate of suspended solids;

FIGS. 4, 5, 6 and 7 show schematic illustrations of the present invention according to the batch-type activated sludge method, in which FIG. 4 shows a receiving step of waste water, FIG. 5 an aeration step, FIG. 6 a precipitation step and FIG. 7 a discharging step of the supernatant; and FIGS. 8, 9 and 10 show schematic illustrations of the present invention according to the continuous-charging, batch-type activated sludge method in which FIG. 8 shows an aeration step, FIG. 9 a precipitation step and FIG. 10 a discharging step of the supernatant.

DETAILED DESCRIPTION OF THE INVENTION

When industrial or home waste water is treated to separate organic or inorganic suspended solids contained in the waste water and the cleaned water is discharged, the present invention realizes rapid precipitation of the suspended solids (1) by enhancing the rate of settling suspended solids by adding a magnet-sensitive powder such as tri-iron tetroxide and, if desired, a coagulant to the waste water and adhering the suspended solids to the magnet-sensitive powder to produce heavier agglomerates, and (2) by attaching one or more magnets to the bottom of the separation or treatment tank to attract the agglomerates. Furthermore, the present invention realizes the efficient and economical separation of the suspended solids contained in waste water by arranging an additional means for promoting the separation.

There has already been known a method for the separation of suspended solids contained in waste water by using one or more magnets and a magnet-sensitive powder. However, such a conventional method is not aimed at rapid precipitation of the suspended solids. According to the conventional method, a part of a disc or belt having a permanent magnet is submerged into a tank, in which the waste water containing the agglomerates is charged, and the disc or belt and then the agglomerates are scraped away outside the tank to recover the sludge.

According to this conventional method, only the agglomerates attracted to the disc or belt running along a predetermined place in the tank can be recovered, while the agglomerates far from the magnets are not attracted to the magnets and remain always in the tank. Even if the liquid in the tank is stirred, all agglomerates cannot be recovered and some agglomerates are contained in the treated water to be discharged. Therefore, this method does not have sufficient cleaning effect.

On the contrary, the present invention is based on the rapid and sure precipitation of the suspended solids due to enhancement of gravity settling and forced attraction by magnetic force, since one or more magnets are attached to the bottom of the separation or treatment tank.

The preferred embodiments of the present invention will now be explained with reference to the accompanying drawings.

At first, a method and a device for the continuous separation of suspended solids by using the separation tank shown in FIG. 1 or 2 will be explained below. This method and device can be applied not only to the activated sludge method, but also to the coagulative precipitation method.

Figure 1:
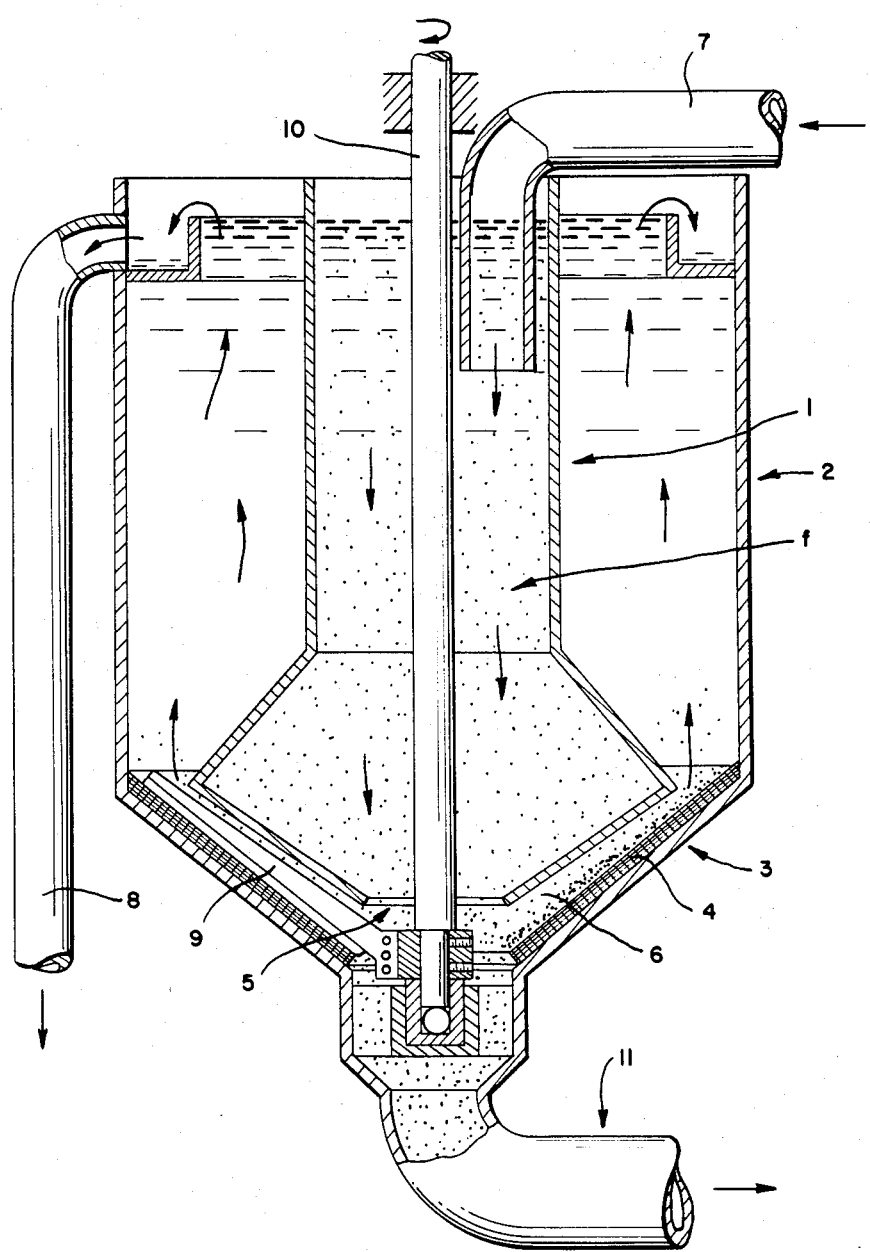
FIGS. 1 and 2 show a longitudinal section illustrating a separation tank for continuous treatment of waste water, which can be used for the activated sludge method and the coagulative precipitation method.

In FIG. 1, the waste water containing the agglomerates is charged into the inner tank 1 from its upper part, and the supernatant is discharged from the top of the outer tank 2. The bottom 3 of the outer tank 2 is in the form of a reverse cone and has one or more magnets 4 composed of a permanent magnet or an electromagnet attached to the internal surface. The inner tank 1 has an opening 5 at the central part of the bottom. Furthermore, the bottom of the inner tank 1 is arranged relatively near to the magnet 4 to form a passage 6 through which the waste water is passed from the inner tank 1 to the outer tank 2. An inlet pipe 7 for connecting with a stirring of aeration tank is arranged above the inner tank 1. The waste water (containing the agglomerates f adhered to a magnet-sensitive powder such as tri-iron tetroxide) is supplied from the inlet pipe 7 and flows through the opening 5 of the central part of the inner tank into the passage 6 formed in face of the magnets 4 and then into the outer tank 2. When the waste water is passed through the passage 6, the magnets 4 attract the agglomerates f containing the magnet-sensitive powder and, as a result, the water flowed into the outer tank 2 is now clean and can be discharged from the drain pipe 8 attached to the upper part of the outer tank.

If all the agglomerates were not attracted to the magnets and flowed into the outer tank 2 together with the water, they are settled by gravity.

One or more scrapers 9 are fixed to a motor-driven rotating shaft 10 at the center of the inner tank 1 in such a manner that the scrapers 9 are in contact with the magnet 4 in the passage 6. When the rotating shaft 10 is rotated, the agglomerates f attracted to the magnet are scraped away by the scrapers and fall along the inclined surface of the conical bottom into the central part of the conical bottom of the outer tank 2. Finally, the agglomerates are removed from the sludge outlet pipe 11 attached at the central part of the conical bottom of the outer tank 2 to the outside of the outer tank 2.

Figure 2:
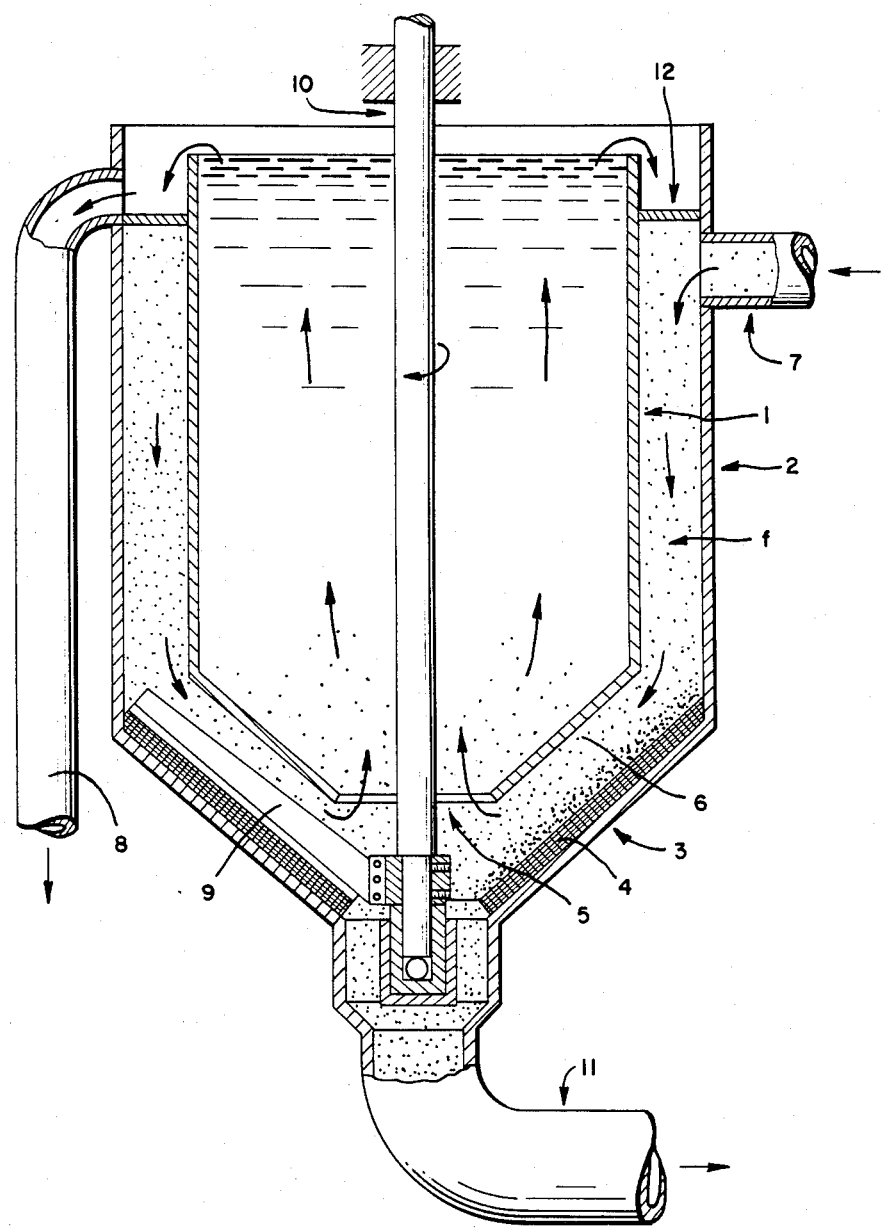

In FIG. 2, the inlet pipe 7 is connected to the upper part of the outer tank 2 and the drain pipe 8 is connected to the upper part of the inner tank 1. The waste water containing the agglomerates is supplied from the upper part of the outer tank 2 and flows through the passage 6 and then the opening 5 into the inner tank 1. The supernatant overflows the upper edge of the inner tank 1 and is received by a plate 12 and then discharged. Namely, the flow direction of the water in FIG. 2 is reverse to that in FIG. 1.

In the devices shown in FIGS. 1 and 2, the surface of the magnet 4 may be covered by a stainless steel or plastic plate and the like because of the smoothness, anticorrosion and security it provides.

According to the method and the device of the present invention, the rate of settling suspended solids can considerably be increased by the gravity-drop promoted by the increase in weight of the suspended solids and by attraction of the magnet 4 attached to the bottom of the outer tank 2. Furthermore, since the waste water containing the agglomerates is surely passed through the narrow passage 6 which is in the face of the magnet 4, the agglomerates are forced to be attracted to the magnet 4 and the water which flowed upwardly in the outer tank 2 in FIG. 1 or in the inner tank 1 in FIG. 2, is now clean and free from suspended solids. The clean water is discharged from the upper part of the tank through the drain pipe 8. Since the agglomerates attracted to the magnet 4 are constantly scraped away by the scraper 9, the surface of the magnet 4 can always function freshly.

In case of the device shown in FIG. 1, when the waste water leaves the narrow passage 6 and enters the wide outer tank, the flow rate of the water may be markedly changed, the agglomerates may "dance", and the separation becomes unstable. The structure shown in FIG. 2 is an improved device to eliminate the variation of the flow rate as much as possible.

The tri-iron tetroxide is used as a magnet-sensitive powder, it does not corrode for a long time in the waste water and, therefore, can be used over a long period.

Rates of precipitation (rapid precipitation is one of the effects of the present invention) are determined according to the activated sludge method, and remarkable results can be observed as shown in FIG. 3.

In FIG. 3, A shows a curve of the rate of settling the suspended solids in the waste water, B shows a curve of the rate of settling the suspended solids, when 8000 ppm of tri-iron tetroxide is added as a magnet-sensitive powder to the waste water and the resulting agglomerates are settled by gravity, and C shows a curve of the rate of settling the suspended solids, when 8000 ppm of tri-iron tetroxide as a magnet-sensitive powder is added to the waste water and the resulting agglomerates are settled by gravity and magnetic force in a tank having a magnet attached to the bottom.

As is clear from FIG. 3, in case of A, the suspended solids are very slowly settled, since the specific gravity of the suspended solids is light, while in case of B, the rate of settling the suspended solids is considerably elevated, since the specific gravity of the magnet-sensitive powder is high. In case of C, more rapid settling is effected by magnetic attraction in addition to the increase in the specific gravity of the suspended solids. In case of B, 50 percent of the suspended solids are settled after three hours, while in case of C, the settling of the suspended solids reaches a maximal level (suspended solids = 20%) after twenty minutes.

When coagulative precipitation is carried out, results similar to the activated sludge method described above can be obtained.

The essence of the present invention described above lies in that the waste water containing aggromerates is necessarily passed through a relatively narrow passage which is formed in the face of a magnet attached to the bottom of a tank. Therefore, according to the present invention, rapid precipitation of suspended solids can be effected by rapid settling of the agglomerates and the attraction to the magnet, and the separation of the suspended solids can be continuously carried out with high efficiency by means of a compact simple device. As a result, the device and the method of the present invention has an economical advantage in that a total running cost is drastically decreased.

The method for the separation of suspended solids according to the batch-type activated sludge method will now be explained with reference to FIGS. 4, 5, 6 and 7.

As a method for treating industrial and home waste water in the same manner as described above, there is known a batch-type activated sludge method in which four steps consisting of a charging step of waste water, an aeration step, precipitation step and a discharging step of the supernatant are carried out in one treatment tank.

The conventional batch-type activated sludge method needs a very long time until the clean supernatant can be obtained, since the specific gravity of suspended solids is light and the suspended solids are slowly precipitated after aeration. Therefore, this method is carried out with low efficiency in a large treatment tank and is liable to discharge a supernatant which contains still the suspended solids.

In short, the problem to be solved in the batch-type activated sludge method is how to precipitate the suspended solids efficiently during a short time.

The present invention attains rapid precipitation in the activated sludge method by using one or more magnets and a magnet-sensitive powder.

Namely, one or more magnets 21 composed of electromagnets or permanent magnets are fixed or removably attached to the bottom of a treatment tank 20. A magnet-sensitive powder such as tri-iron tetroxide is supplied together with sludge microorganisms into the treatment tank 20. The suspended solids contained in the waste water adhere to the magnet-sensitive powder to produce agglomerates f. Since the weight of the suspended solids is increased by forming the agglomerates, they rapidly settle. Moreover, the magnets 21 are operated during the precipitation step and, if desired, during the discharging step of the supernatant to attract the agglomerates f. Thus, rapid precipitation of the suspended solids can be performed.

In FIGS. 4 to 7, 22 shows an aeration means, 23 a floating drain pipe, 24 a flexible pipe, 25 a drain pipe and 26 an inlet pipe.

When an electromagnet is used as the magnet 21, it can be operated by a switch. When a permanent magent is used, it is thrown into the tank to operate, or it is removed from the tank to stop operating.

Figure 4:
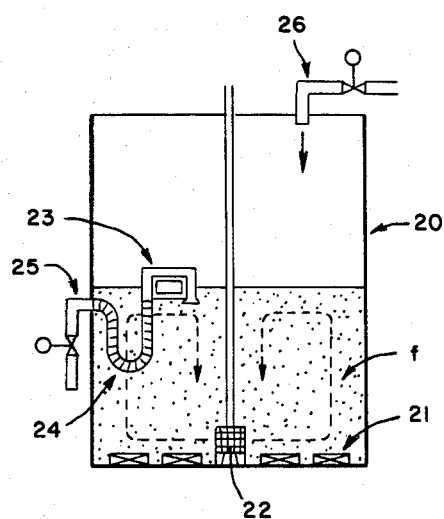

The batch-type activated sludge method will be more detailed below:

FIG. 4 illustrates the step of charging waste water. The waste water is charged through the inlet pipe 26 into the aeration tank in which the drain pipe 25 is closed. The aeration means is started to operate, while the magnet is not yet operated.

Figure 5:
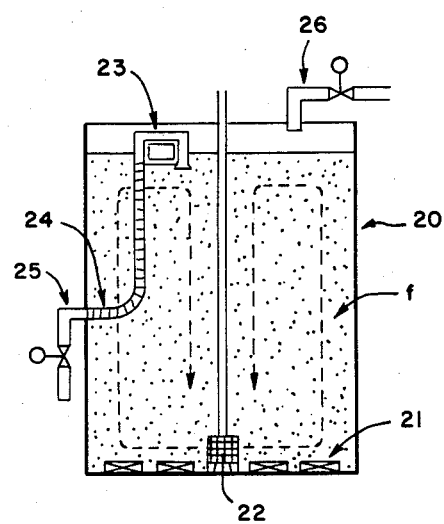
Figure 6:
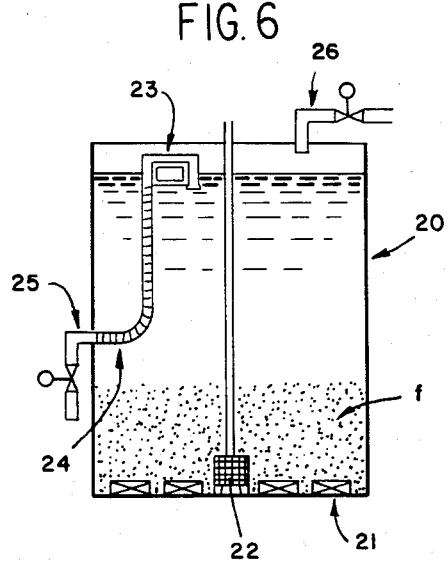

When the tank is nearly filled with the waste water, the inlet pipe 26 is closed and then the aeration step shown in FIG. 5 is started. In this step, the aeration means is operated and the waste water is circulated in such a manner as shown by the dashed line in FIG. 5, whereby the suspended solids are self-digested by the sludge microorganisms. After an appropriate time, the aeration means is switched off and the precipitation step is started. The magnet 21 is now operated. Since the suspended solids were adhered to the magnet-sensitive powder to produce heavier agglomerates, gravity settling is promoted. In addition, since the agglomerates f are attracted to the magnet 21, the precipitation is more rapidly effected.

Figure 7:
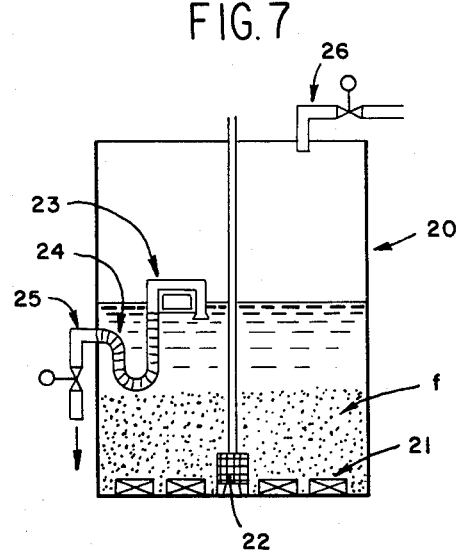

When the precipitation is completed, the drain pipe 25 is opened, the step of discharging the supernatant shown in FIG. 7 is started. The supernatant is discharged from the floating drain pipe 23 floating on the surface of the water via the flexible pipe 24 through the drain pipe 25. The flexible pipe 24 is arranged so as to adapt to variations of the level of the water.

In this step of discharging the supernatant, the magnet 21 may be operated or not be operated. However, when the permanent magnet is used, the magnet is removed after the step of discharging the supernatant is completed.

When the level of the water is lowered to an adequate level, the drain pipe 25 is closed and the step of charging the waste water is again started and the subsequent steps are repeated in the same manner as described above.

Each step of this batch-type activated sludge method is generally carried out in a full-automatic operation by setting a 24-hour timer at a desirable time for each step. Naturally, each step can be manually operated.

Tri-iron tetroxide is preferred as a magnet-sensitive powder, since it does not corrode for a long time in the waste water.

In this batch-type activated sludge method, the organic suspended solids are self-digested by sludge microorganisms and the sludge does not, as a rule, remain in the tank. However, a small amount of the sludge may remain because of unbalance of the amount of the suspended solids with the amount of the sludge microorganisms or for other reasons. On the other hand, the waste water may sometimes contain a small amount of the inorganic suspended solids. The inorganic suspended solids are not self-digested and remain on the bottom of the tank. Therefore, the accumulated sludge should sometimes be removed.

The separation of the suspended solids according to the continuous-charging, batch-type activated sludge method will now be explained with references to FIGS. 8, 9 and 10.

The continuous charging, batch-type activated sludge method is one variation of the batch-type activated sludge method described above and different from the batch-type activated sludge method only in that the waste water is continuously charged into the tank. The steps of the aeration, precipitation and discharging are carried out in the same manner as described above. However, since the waste water is continuously charged, the level of the water is always changed in the treatment tank.

In order to perform this continuous-charging, batch-type activated sludge method, rapid precipitation must be effected. The present invention realizes rapid precipitation by using a magnet-sensitive powder and one or more magnets to complete the continuous-charging, batch-type activated sludge method.

A receiving chamber 30 in which the waste water is continuously charged, is connected at its bottom to a treatment chamber 31 in which the steps of the aeration, the precipitation of the suspended solids and the discharge of the supernatant are successively carried out. The magnets 33 composed of electromagnets or permanent magnets are fixed or removably attached to the bottom of the treatment chamber 31. A magnet-sensitive powder such as tri-iron tetroxide is supplied together with sludge microorganisms into the treatment chamber 31. The suspended solids contained in the waste water are adhered to the magnet-sensitive powder to produce the agglomerates f, whereby the suspended solids are increased in weight and rapidly settled. Additionally, the magnet 33 are operated during the precipitation step and, if desired, during the step of discharging the supernatant to attract the agglomerates f and to permit the rapid precipitation of the agglomerates.

In FIG. 8, 34 shows an aeration means, 35 a floating drain pipe, 36 a flexible pipe, 37 a drain pipe and 38 a waste water inlet.

The magnets 33 are operated in the same manner as described with reference to the batch-type activated sludge method.

The continuous-charging, batch type activated sludge method will be more detailed below.

The waste water is continuously charged in a constant rate from the waste water inlet 38 into the receiving chamber 30 during the whole steps consisting of the aeration step shown in FIG. 8, the precipitation step shown in FIG. 9 and the discharging step shown in FIG. 10. In the treatment chamber 31, the aeration step shown in FIG. 8, the precipitation step shown in FIG. 9 and the step of discharging the supernatant shown in FIG. 10 are successively carried out in the same manner as described above with reference to the batch-type activated sludge method.

Furthermore, as described above, each step can be operated automatically by means of a 24-hour timer or, if desired, manually. Tri-iron tetroxide is preferred as the magnet-sensitive powder, and the sludge accumulated on the bottom of the treatment chamber must be sometimes removed.

According to the activated sludge method of the batch-type and the continuous-charging batch-type described above, the separation of the suspended solids can be promoted by gravity settling and magnetic attraction, the time required for the precipitation can be greatly shortened, the batch cycle can also be shortened, cleaning efficiency can be enhanced. The device can be made compact and the total running cost can be decreased.

While the invention has been shown and described with reference to preferred embodiment thereof, it will be obvious to those skilled in the art that various changes and modifications may be made therein without departing from the scope of the invention as defined by the following claims.

I claim:

1. Method for the separation of suspended solids in waste water, which comprises precluding a requirement for adding coagulants by adding a magnet-sensitive powder to the waste water containing suspended solids, forming agglomerates by adhesion of the suspended solids with the magnet-sensitive powder, whereby the suspended solids are increased in weight to promote gravity settling, charging the waste water containing the agglomerates into a separation tank having one or more magnets attached to its bottom and then passing the waste water containing the agglomerates through a relatively narrow passage formed in the face of the magnet, so that the agglomerates are attracted by the magnet.

2. Method for the separation of suspended solids in waste water as claimed in claim 1, wherein the bottom of said separation tank has a shape of a reverse cone, the magnet is attached to a surface of the conical bottom, the agglomerates attracted to the surface of the magnet are scraped away into the central part of the conical bottom by a scraper rotating in contact with the surface of the magnet whereby the magnet always operates freshly and the agglomerates are removed from the tank.

3. Method for the separation of suspended solids in waste water as claimed in claim 1, wherein tri-iron tetroxide is used as said magnet-sensitive powder.

4. Device for the separation of suspended solids in waste water, which comprises elements designed to preclude a requirement for coagulation addition, including a separation tank consisting of an inner tank and an outer tank, said inner tank for charging water containing agglomerates formed by adhesion of suspended solids with a magnet-sensitive powder; one or more magnets attached to a surface of a reverse conical bottom of the outer tank; an opening at a central part of the bottom of the inner tank arranged relatively near to the magnet to form a passage through which the waste water is passed from the inner tank to the outer tank; a scraper rotating in contact with the surface of the magnet and for scraping off the agglomerates attracted to the magnet; a sludge outlet for removing the scraped agglomerates at the central part of the conical bottom of the outer tank; an inlet pipe for waste water at an upper part of the inner tank; and an outlet pipe for supernatant at an upper part of the outer tank.

5. Device for the separation of suspended solids in waste water as claimed in claim 4, wherein a permanent magnet is used as the magnet attached to the surface of the conical bottom.

6. Device for the separation of suspended solids in waste water as claimed in claim 4, wherein an electromagnet is used as the magnet attached to the surface of the conical bottom.

7. Device for the separation of suspended solids in waste water as claimed in claim 4, wherein the surface of the magnet is covered with a stainless steel plate.

8. Device for the separation of suspended solids in waste water as claimed in claim 4, wherein the surface of the magnet is covered with a plastic plate.

9. Device for separation of suspended solids in waste water, which comprises elements designed to preclude a requirement for coagulation addition, including a separation tank consisting of an inner tank and an outer tank, said outer tank for changing water containing agglomerates formed by adhesion of suspended solids with a magnet-sensitive powder; a magnet attached to the internal surface of a reverse conical bottom of the outer tank; an opening at the central part of the bottom of the inner tank arranged relatively near to the magnet to form a passage through which the waste water is passed from the outer tank to the inner tank; a scraper rotating in contact with the surface of the magnet and scraping off the agglomerates attracted to the magnet; a sludge outlet for removing the scraped agglomerates at the central part of the conical bottom of the outer tank; an inlet pipe for waste water at an upper part of the outer tank; and an outlet pipe for supernatant at an upper part of the inner tank.

10. Device for the separation of suspended solids in waste water as claimed in claim 9, wherein a permanent magnet is used as the magnet attached to the surface of the conical bottom.

11. Device for the separation of suspended solids in waste water as claimed in claim 9, wherein an electromagnet is used as the magnet attached to the surface of the conical bottom.

12. Device for the separation of suspended solids in waste water as claimed in claim 9, wherein the surface of the magnet is covered with a stainless steel plate.

13. Device for the separation of suspended solids in waste water as claimed in claim 9, wherein the surface of the magnet is covered with a plastic plate.

14. Method for the separation of suspended solids in waste water according to the batch-type activated sludge method consisting of steps of precluding a requirement for adding coagulants by charging the waste water, aeration, precipitation and discharging the supernatant, which comprises fixing or removably attaching one or more magnets to a bottom of a treatment tank, supplying a magnet-sensitive powder together while sludge microorganisms into the tank to produce agglomerates by adhesion of the suspended solids with the magnet-sensitive powder whereby the suspended solids are increased in weight and rapidly settled; and operating the magnet during the precipitation step.

15. The method of claim 14 further comprising operating the magnet during the step of discharging the supernatant to attract the agglomerates and permit rapid precipitation of the agglomerates.

16. Method for the separation of suspended solids in waste water as claimed in claim 14, wherein an electromagnet is used as the magnet attached to the bottom of the treatment tank and the magnet is operated by a switch.

17. Method for the separation of suspended solids in waste water as claimed in claim 14, wherein a permanent magnet is used as the magnet attached to the bottom of the treatment tank, and the magnet is removably attached and operated by attaching it and removing it to stop operating.

18. Method for the separation of suspended solids in waste water as claimed in claim 14, wherein tri-iron tetroxide is used as said magnet-sensitive powder.

19. Method for the separation of suspended solids in waste water, which comprises precluding a requirement for adding coagulants by connecting at a lower part a chamber for waste water continuously charged to a treatment chamber in which the steps of aeration, precipitation of the suspended solids and discharge of the supernatant are successively carried out; fixing or removably attaching one or more magnets to the bottom of the treatment chamber; supplying a magnet-sensitive powder together with sludge microorganisms into the treatment chamber; adhering the suspended solids to the magnet-sensitive powder to produce agglomerates, whereby the suspended solids are increased in weight and rapidly settled; and operating the magnets during the precipitation step to attract the agglomerates and permit the rapid precipitation of the agglomerates.

20. Method for separation of suspended solids according to claim 19, further comprising operating the magnet during the step of discharging.

21. Method for the separation of suspended solids in waste water as claimed in claim 19, wherein electromagnets are used as the magnet attached to the bottom of the treatment tank and operated by a switch.

22. Method for the separation of suspended solids in waste water as claimed in claim 19, wherein permanent magnets are used as the magnet attached to the bottom of the treatment tank, and the magnets are removably attached and operated and removed to stop operating.

23. Method for the separation of suspended solid in waste water as claimed in claim 19, wherein tri-iron tetroxide is used as said magnet-sensitive powder.

* * * * *